(12) United States Patent
Tsukioka

(10) Patent No.: US 7,181,092 B2
(45) Date of Patent: Feb. 20, 2007

(54) IMAGING APPARATUS

(75) Inventor: Taketo Tsukioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 798 days.

(21) Appl. No.: 10/457,134

(22) Filed: Jun. 9, 2003

(65) Prior Publication Data

US 2003/0231251 A1 Dec. 18, 2003

(30) Foreign Application Priority Data

Jun. 12, 2002 (JP) ............................. 2002-170791

(51) Int. Cl.
*G06K 7/00* (2006.01)
*H04N 1/46* (2006.01)

(52) U.S. Cl. .................................................... 382/312

(58) Field of Classification Search ................ 382/162, 382/165, 167, 312, 260–264; 345/589, 592, 345/600–604; 358/505, 512, 514, 515, 518, 358/525; 348/222.1, 272, 273, 281, 305
See application file for complete search history.

(56) References Cited

U.S. PATENT DOCUMENTS

| | | | | |
|---|---|---|---|---|
| 4,642,678 A * | 2/1987 | Cok | ............................ | 348/242 |
| 6,289,139 B1 * | 9/2001 | Chen et al. | ................. | 382/312 |
| 6,847,396 B1 * | 1/2005 | Lin | ............................ | 348/273 |
| 6,934,050 B2 * | 8/2005 | Merrill et al. | ............. | 358/1.16 |
| 2003/0231251 A1 * | 12/2003 | Tsukioka | .................... | 348/272 |
| 2003/0231807 A1 * | 12/2003 | Ozawa | ....................... | 382/324 |

FOREIGN PATENT DOCUMENTS

JP 9247689 9/1997

* cited by examiner

*Primary Examiner*—Amir Alavi
(74) *Attorney, Agent, or Firm*—Volpe & Koenig, P.C.

(57) ABSTRACT

An imaging apparatus including: a single-chip image sensor with a color filter array and capable of intermittent readout operation in horizontal and vertical directions; an intermittence control means for controlling the intermittent readout operation of the image sensor; and an interpolation means for processing signals read out from the image sensor in a thinned out pattern designated by the intermittence control means to form a reduced image consisting of trichromatic components; wherein the intermittence control means reads signals at a plurality of locations on the image sensor correspondingly to each pixel of the reduced image and controls reading at that time so that there are two or more types of color filters at the readout locations and at least one type of the color filters thereof is common to all pixels of the reduced image and at least one type of the color filters is not common to all pixels of the reduced image; and the interpolation means supplements signals corresponding to the type of unread color filter at each pixel of the reduced image to compute trichromatic components of an observed pixel.

18 Claims, 13 Drawing Sheets

READOUT BY AVERAGING PIXEL VALUES OF PLURAL PIXELS

INTERMITTENT READOUT AT PREDETERMINED INTERVALS

SKIP READOUT OF ARBITRARY LINES

COMBINATION OF AVERAGING READOUT AND INTERMITTENT READOUT

FIG. 3A
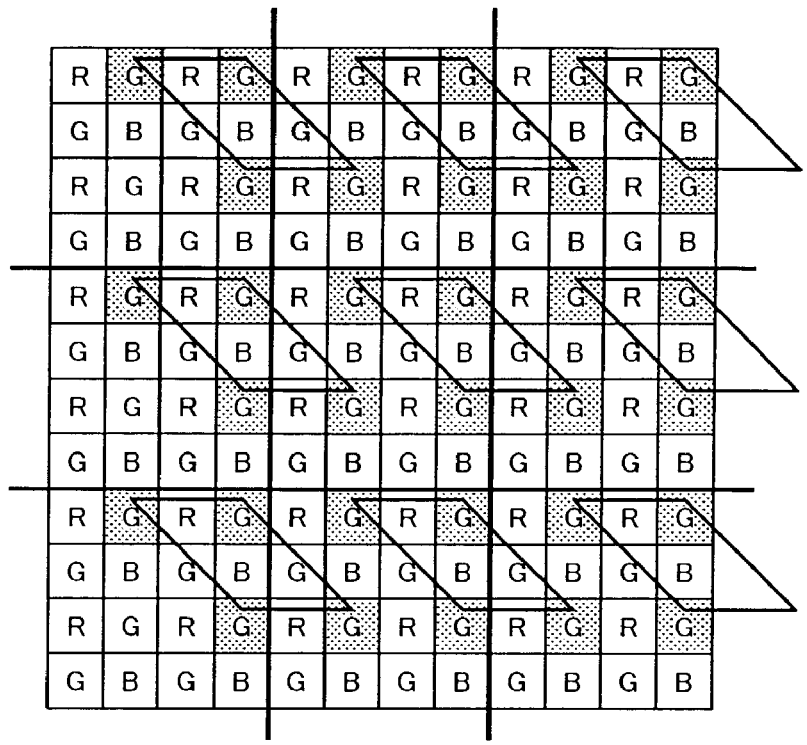
FIG. 3B
READOUT TYPE I
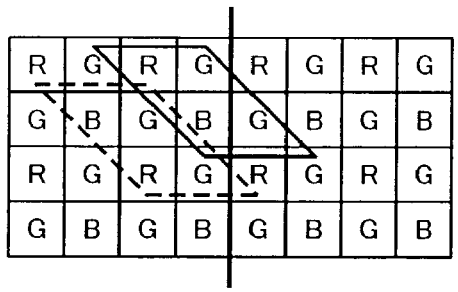
FIG. 3C
READOUT TYPE II
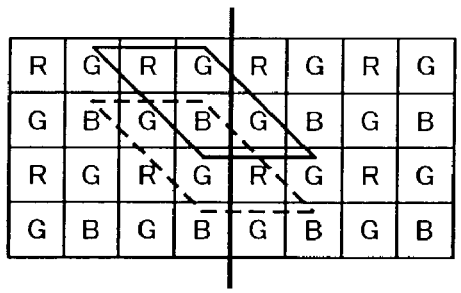
FIG. 3D
FRAME 2n
FIG. 3E
FRAME 2n+1

FIG. 4A

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

| R | B | R | B | R | B |
|---|---|---|---|---|---|
| B | R | B | R | B | R |
| R | B | R | B | R | B |
| B | R | B | R | B | R |
| R | B | R | B | R | B |
| B | R | B | R | B | R |

FRAME 2n

FIG. 4B

| G | G | G | G | G | G |
|---|---|---|---|---|---|
| G | G | G4 | G | G | G |
| G | G3 | G1 | G2 | G | G |
| G | G | G5 | G | G | G |
| G | G | G | G | G | G |
| G | G | G | G | G | G |

| B | R | B | R | B | R |
|---|---|---|---|---|---|
| R | B | R4 | B | R | B |
| B | R3 | B1 | R2 | B | R |
| R | B | R5 | B | R | B |
| B | R | B | R | B | R |
| R | B | R | B | R | B |

FRAME 2n+1

FIG. 5A

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |

READOUT TYPE III

FIG. 5B

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |

READOUT TYPE IV

FRAME 2n

FIG. 11B  R#=(G*−R*)+G#

FRAME 2n+1

READOUT TYPE X

READOUT TYPE Y

2 × 2 BLOCK
FRAME 2n
(READOUT OF R AND G)

FRAME 2n+1
(READOUT OF B AND G)

FRAME 2n
(READOUT OF R AND G)

FRAME 2n+1
(READOUT OF B AND G)

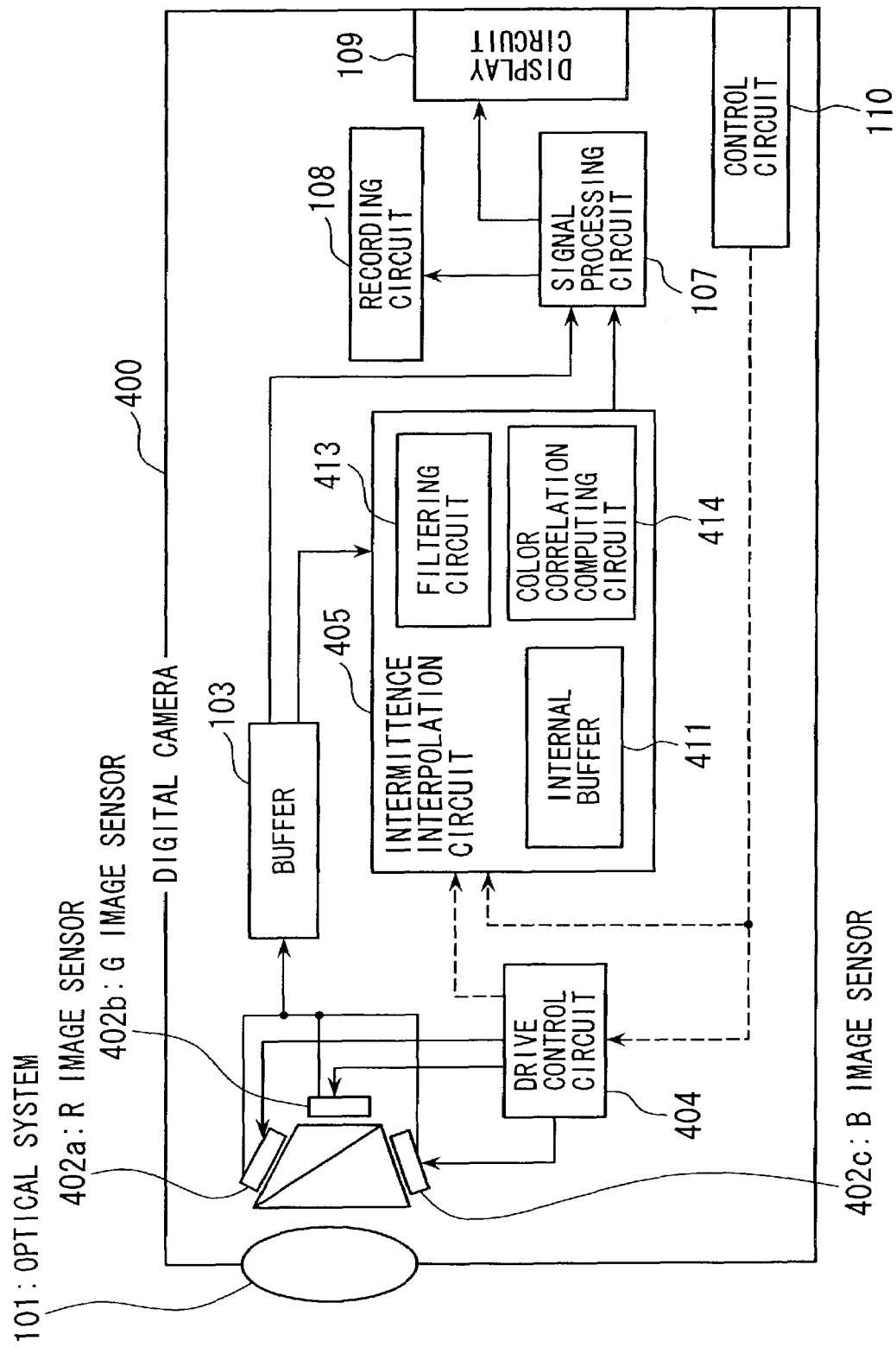

FIG. 15A
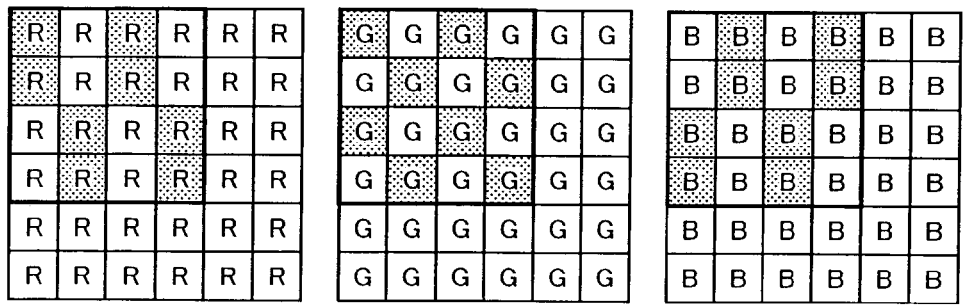
FIG. 15B  FIG. 15C
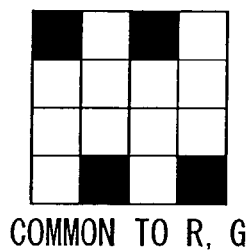
COMMON TO R, G
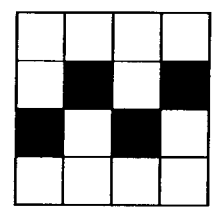
COMMON TO B, G
FIG. 16
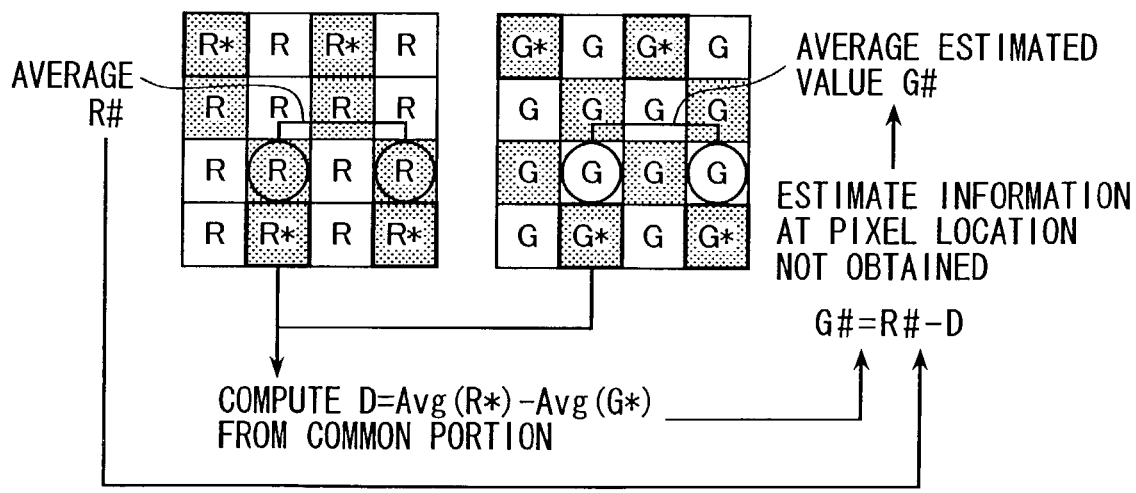

IMAGING APPARATUS

CROSS REFERENCE TO RELATED APPLICATION(S)

This application claims benefit of Japanese Patent Application No. 2002-170791 filed in Japan on Jun. 12, 2002, the contents of which are incorporated by this reference.

BACKGROUND OF THE INVENTION

The present invention relates to imaging apparatus, and more particularly relates to high-definition electronic still imaging apparatus having a liquid crystal view finder and also to imaging apparatus in which both dynamic video image taking and high-definition electronic still image taking are made possible.

Because of the rapid spreading of personal computers in recent years, there is an increasing demand for digital cameras (electronic still camera) as an image input equipment. Also, high-quality image recording apparatus such as digital video camera are widely used as a recording equipment of dynamic images. Since, in these image input equipment, the number of pixels of an image sensor is a major factor for determining the resolution of taken images, the pixel number tends to increase from year to year. Some digital cameras in the recent market are sold even with a large number of pixels of 4,000,000 or more. The digital cameras are generally provided with a real-time electronic finder as a means for confirming the extent of object to be photographed. Further it is not uncommon for a digital camera to be capable also of taking dynamic images.

To achieve the function of dynamic image recording or electronic finder, images must be taken in real time (30 frames per second or more) with each having a number of pixels of the order of one of several to several-ten parts of the pixel number of image sensor. In an image sensor having several million pixels, however, it is difficult, because of operation clock, to read all the pixels at the rate of 30 frames per second. For this reason, methods have been suggested of processing thinned out signals to generate a reduced image by using an imaging apparatus which has a function in specific mode to intermittently read only a required number of pixels from the image sensor.

Examples thereof include a single-sensor imaging apparatus as disclosed in Japanese patent application laid-open Hei-9-247689. The image sensor disclosed therein uses an XY-addressing type image sensor capable of directly reading pixels at designated locations. In the mode for intermittent read, then, it also uses a signal processing circuit for reading four pixels of the pixels at filter locations of same color and computing an average thereof so as to obtain signals in a mosaic filter pattern identical to that without being thinned out. In the case of CCD image sensor incapable of such reading, it is a common method to obtain a vertical average by adding current values in the vertical direction and at the same time to effect an intermittent read.

SUMMARY OF THE INVENTION

It is an object of the present invention to provide imaging apparatus in which an occurrence of spurious signal is prevented even when dynamic images are read out at a relatively high frame rate from a high-resolution image sensor.

In a first aspect of the imaging apparatus according to the invention, the imaging apparatus includes: a single-chip image sensor with a color filter array and capable of intermittent readout operation in horizontal and vertical directions; an intermittent control means for controlling the intermittent readout operation of the image sensor; and an interpolation means for processing signals read out from the image sensor in a thinned out pattern designated by the intermittence control means to form a reduced image consisting of trichromatic components. The control means reads signals at a plurality of locations on the image sensor correspondingly to each pixel of the reduced image and controls reading at that time so that there are two or more types of color filters at the readout locations and at least one type of the color filters thereof is common to all pixels of the reduced image and at least one type of the color filters is not common to all pixels of the reduced image. The interpolation means supplements signals corresponding to the type of unread color filter at each pixel of the reduced image to compute trichromatic components of an observed pixel.

In a second aspect of the invention, the color filter array of the imaging apparatus according to the first aspect is of a primary-color Bayer matrix, and the intermittent control means controls reading so that a combination of R and G or a combination of B and G is the types of color filters to be read out correspondingly to each pixel of the reduced image and at the same time controls reading to achieve a checkered pattern arrangement of the pixels corresponding to the combined readouts of R and G and the pixels corresponding to the combined readouts of B and G.

In a third aspect of the invention, the intermittent control means of the imaging apparatus according to the first aspect repeats an intermittent read of frame from the image sensor at predetermined time intervals and controls reading at that time so that two or more types of the color filters are read out in common to all pixels of the reduced image, and at least one type of the color filters thereof is common to all the frames and at the same time at least one type of the color filters is different among the frames.

In a fourth aspect of the invention, the intermittent control means of the imaging apparatus according to the second aspect repeats an intermittent readout of a frame from the image sensor at predetermined time intervals and controls reading at that time so that the arrangement of the pixels corresponding to the combined readouts of the color filters of R and G and the pixels corresponding to the combined readouts of the color filters of B and G in the reduced image is inverted between two successive frames.

In a fifth aspect of the invention, the intermittent control means of the imaging apparatus according to the first aspect repeats an intermittent readout of a frame from the image sensor at predetermined time intervals and controls reading at that time so that at least one type of color component is read out in common among frames and at the same time the readout locations of the color component of the type to be read out in common among the frames are partially in common and partially different among the frames.

In a sixth aspect of the invention, an imaging apparatus includes: a plurality of image sensors capable of an intermittent readout operation in horizontal and vertical directions and respectively having different type of color filters in front thereof; an intermittent control means for controlling the intermittent readout operation of the plurality of image sensors; and an interpolation means for processing signals read out from the plurality of image sensors in a thinned out pattern designated by the intermittent control means to form a reduced image consisting of trichromatic components. The intermittent control means reads signals at a plurality of locations on each of the image sensors corresponding to each pixel of the reduced image and controls reading at that time so that some of the read locations from each image sensor are different among the image sensors and some others thereof are common to all the image sensors. The interpolation means estimates the color correlation parameter of signals from the respective image sensors at the readout locations common to all the image sensors at each pixel of the reduced image to compute the trichromatic components of each pixel of the reduced image based on result of such estimation and signals from the respective image sensors.

In a seventh aspect of the invention, the interpolation means of the imaging apparatus according to any one of the first to fifth aspects computes similarity between an observed pixel and those pixels in the vicinity thereof in time and in space based on comparison of signals of the color filters of the type obtained common to all pixels at each pixel of the reduced image and, with respect to the vicinity pixels judged as having a high similarity, estimates color correlative relation between signals of the color filter of the type not obtained at the observed pixel and signals of the color filter of the type obtained at the observed pixel to compute trichromatic components of each pixel of the reduced image based on result of the estimation and signal value obtained at the observed pixel.

In an eighth aspect of the invention, the intermittent control means of the imaging apparatus according to anyone of the first to fifth aspects repeats an intermittent readout of a frame from the image sensor at predetermined time intervals and controls reading at that time so that readout locations are partially common and partially not common between the successive frames, and the interpolation means detects motion between the frames based on signals at the readout locations common between the frames to determine based on result of the detection whether or not to use signals at the not-common readout locations in interpolation processing.

In a ninth aspect of the invention, the intermittent control means of the imaging apparatus according to any one of the first to fifth aspects repeats an intermittent readout of a frame from the image sensor at predetermined time intervals, and at that time the interpolation means measures the local frequency characteristic within the frame based on signals of the color filters of the type read out in common to all pixels of the reduced image, and the intermittent control means determines an intermittent readout pattern of next frame in accordance with result of the measurement of the frequency characteristic.

BRIEF DESCRIPTION OF THE DRAWINGS

FIGS. 3A to 3E illustrate intermittent readout patterns in the first embodiment.

FIGS. 4A and 4B illustrate color processing for a double-sensor imaging system.

FIGS. 5A and 5B show a modification of read pattern in the first embodiment and an intermittent readout pattern of 4×4 block in a second embodiment.

FIGS. 10A and 10B illustrate intermittent readout patterns in the third embodiment.

FIGS. 11A and 11B explain a method for estimating a missing chromatic component by using a motion compensation circuit in the third embodiment.

FIG. 14 is a block diagram showing a fourth embodiment of the invention.

FIGS. 15A to 15C illustrate an intermittent readout pattern in the fourth embodiment.

FIG. 16 illustrates pixel value prediction by the color correlation computing circuit in the fourth embodiment.

DESCRIPTION OF THE PREFERRED EMBODIMENTS

First Embodiment

Figure 1:
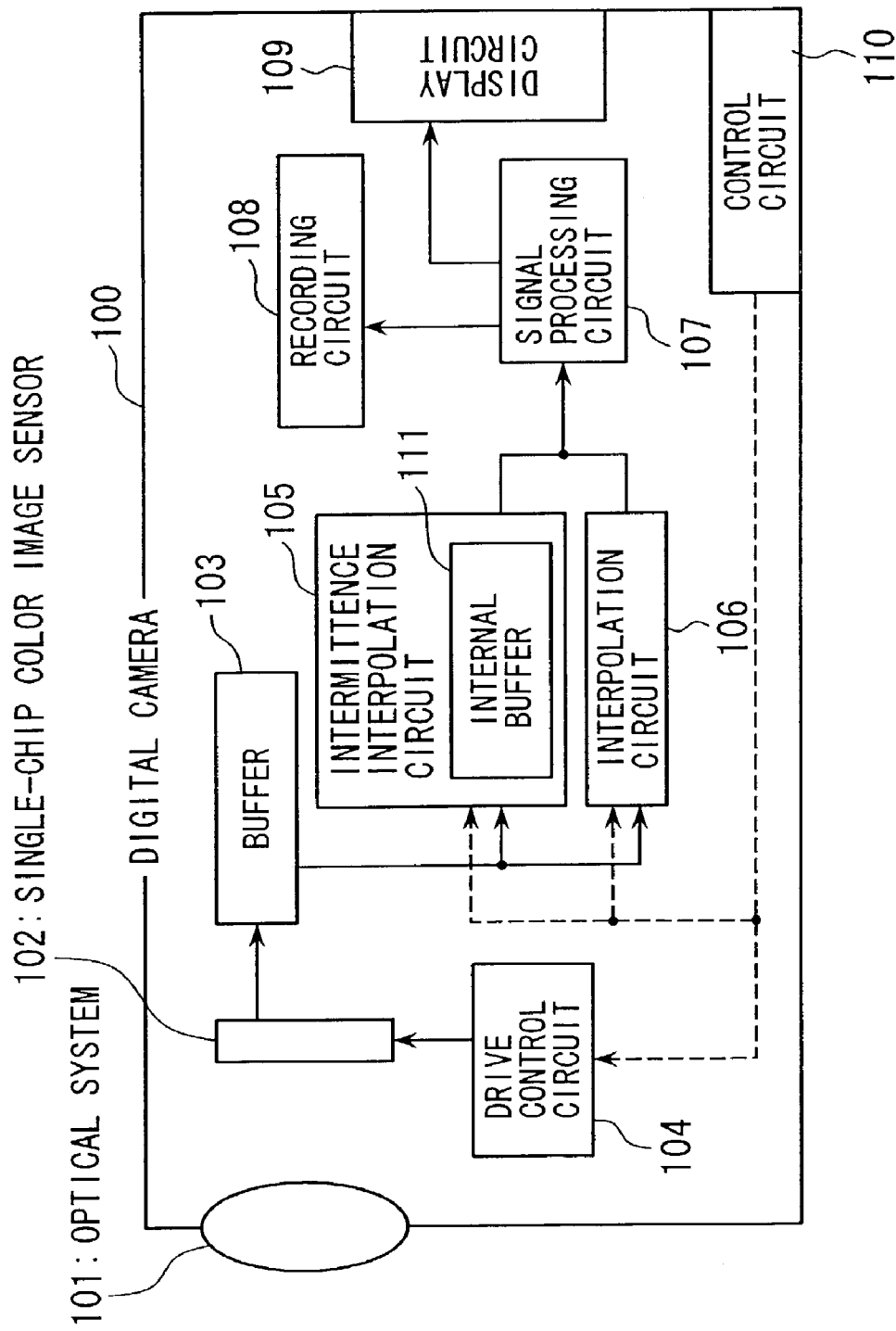
FIG. 1 is a block diagram showing a first embodiment of the imaging apparatus according to the invention.

Some embodiments of the invention will now be described. FIG. 1 is a block diagram showing a first embodiment of the imaging apparatus according to the present invention where the invention is applied to a digital camera. As shown in FIG. 1, the digital camera 100 according to this embodiment includes: an optical system 101; a single-chip color image sensor 102 capable of intermittent readout; a buffer 103 for storing outputs from the single-chip color image sensor 102; a drive control circuit 104 for controlling the manner of intermittent readout of the single-chip color image sensor 102; an intermittence interpolation circuit 105 for, when a dynamic image recording mode is set, effecting an interpolation processing of signals intermittently read out from the single-chip color image sensor 102 to generate a reduced color image within an internal buffer 111; an interpolation circuit 106 for, when a normal recording mode is set, effecting an interpolation processing of the results normally read out from the single-chip color image sensor 102 to generate a color image without reduction and for effecting an averaging processing of pixel values of interpolated pixel blocks; a signal processing circuit 107 for processing outputs of the intermittence interpolation circuit 105 or interpolation circuit 106 to improve image quality; a recording circuit 108 for recording outputs of the signal processing circuit 107 to a recording medium; a display circuit 109 for displaying outputs of the signal processing circuit 107 on a liquid crystal display device; and a control circuit 110 for controlling operation of the above circuits.

The operation of digital camera 100 having the construction as described will now be described. In normal mode image taking, when a shutter (not shown) is pressed down by the user, the control circuit 110 sets the drive control circuit 104 to an all-pixel read mode and the drive control circuit 104 drives the single-chip color image sensor 102 to perform image taking. The signals of all pixels from the single-chip color image sensor 102 are thereby outputted to the buffer 103. Upon completion of the output from the single-chip color image sensor 102, the control circuit 110 causes operation of the interpolation circuit 106 so that the interpolation circuit 106 generates a color image by an interpolation processing and outputs to the signal processing circuit 107. At the signal processing circuit 107, such image quality control processings as matrix color conversion, gamma correction, edge enhancement are performed on the inputted color image and the processed color image is outputted to the recording circuit 108. At the recording circuit 108, the inputted color image is compressed and recorded to a recording medium (not shown).

Further, the interpolation circuit 106, in parallel with the outputting to the recording circuit 108, performs processing for averaging pixel values of the specified pixel blocks and stores results of the averaging to an internal buffer 111. As a result of such averaging, at a point in time of the completion of the interpolation processing, a reduced image of the color image recorded by the recording medium 108 is formed in the internal buffer 111. Upon completion of the operation of the recording circuit 108, the control circuit 110 outputs to the signal processing circuit 107 the reduced image in the internal buffer 111 of the interpolation circuit 106. Finally, the image taking is complete when the signal processing circuit 107 outputs an image after image quality control processing to the display circuit 109 so that the result of the image taking is presented to the user.

On the other hand, when a dynamic image recording mode is set and the shutter is pressed down by the user, the drive control circuit 104 drives the single-chip color image sensor 102 for an intermittent read. The single-chip color image sensor 102 is a CMOS image sensor and is capable of averaging readout and intermittent readout (omission in reading) in the horizontal direction and of line skip readout (omission of lines in reading) in the vertical direction. FIGS. 2A to 2D show the manner of these readouts of the single-chip color image sensor 102. The averaging read shown in FIG. 2A for reading by averaging pixel values of a plurality of pixels in the horizontal direction is executed based on a parallel connection of capacitors associated with each pixel of CMOS image sensor so that a risk of charge overflow as in CCD image sensor is not involved. Further, read time thereof becomes the same as the case of pixel-by-pixel readout without averaging.

Figure 2A:
FIGS. 2A to 2D illustrate read functions of the single-chip color image sensor in the first embodiment shown in FIG. 1.
Figure 2B:
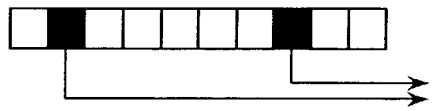
Figure 2C:
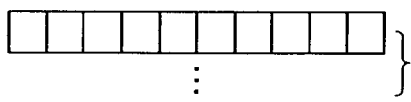
Figure 2D:
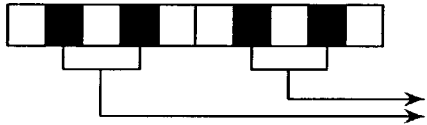

The intermittent readout in the horizontal direction as shown in FIG. 2B is achieved by providing a locally bypass wiring in the shift register to be used in reading of horizontal lines. Further, the first readout location within a line in the intermittent readout is also variable. The settings of the number of pixels to be averaged and the locations to be thinned out are programmable from an external section. FIG. 2C shows the manner of omitting an arbitrary number of lines (vertical thinning out skip), and FIG. 2D shows a manner of combining the averaging readout shown in FIG. 2A and the intermittent readout shown in FIG. 2B.

The drive control circuit 104 makes use of these readout functions of the single-chip color image sensor 102 to execute reading by the averaging and intermittent read of the pixels of the single-chip color image sensor 102 in readout patterns where occurrence of moire becomes less and outputs result thereof to the buffer 103.

A description will now be given with respect to the intermittent read patterns by way of an example where the mosaic filter arrangement of the single-chip color image sensor 102 is of a primary-color Bayer matrix and the thinning-out rate in vertical and horizontal directions is ¼. It should be noted that the vertical and horizontal thinning-out rates of ¼ does not mean that only one pixel can be read out per 4×4 pixel block. Currently, the number of pixels required to be outputted within one frame period as a real-time dynamic image in a dynamic image recording mode of digital camera is generally of QVGA (320×240) or VGA (640×480). For this reason, readout of signals of more than one pixel from the above described 4×4 pixel block is permissible as long as the drive rate of the image sensor is sufficiently high to such an extent that the read period is within "one frame period minus postprocessing period". In the following example, it is a premise of the explanation that up to 4 pixels per 4×4 pixel block can be read out.

Shown in FIGS. 3A to 3E are intermittent readout patterns of the drive processing circuit 104 in the intermittent readout at a thinning-out rate of ¼. In this intermittent readout pattern, signals of four G-filter locations at the respective corners of parallelogram patterns shown in the figures are averaged and read out in all of the 4×4 pixel blocks in the primary-color Bayer matrix of the single-chip color image sensor 102 shown in FIG. 3A.

Further, with respect to signals of the locations of R, B filters, there are two types of readout: a type of readout as shown in FIG. 3B where signals at the locations of four R filters located at the respective corners also of a parallelogram pattern (dotted line in the figure) of 4×4 pixel block are read out and averaged but signals at B-filter locations are not read out (readout type I); and a type of readout as shown in FIG. 3C where signals at the locations of four B filters located at the respective corners of parallelogram pattern (dotted line) are read out and averaged but signals at R-filter locations are not read out (readout type II).

According to the location of 4×4 pixel block, then, a frame-by-frame setting is made, as shown in FIGS. 3D, 3E, as to which one of the patterns is to be read out. In FIGS. 3D, 3E, each rectangular region corresponds to a 4×4 pixel block and the symbol (I or II) in each rectangular region indicates by which one of the readout types the block is to be read out. This intermittent read pattern is characterized in two points that the pixel blocks corresponding to the two readout types are arranged in a checker arrangement and that the checkered arrangement is inverted frame by frame.

It should be noted that the respective readout patterns of R, G, B, can be achieved by a combination of the basic operations of averaging readout, intermittent readout (omission in reading), line skip readout as shown in FIGS. 2A to 2C. For example, reading and averaging of signals at G-filter locations of a parallelogram pattern are performed in steps as follows. In particular, operations are repeated in the vertical direction: (1) a pattern in which 2 pixels are averaged and 2 pixels are not read in the horizontal direction is repeated from the second pixel within line; (2) one line is skipped; (3) the same operation as (1) is performed with shifting the first read location rightward by two pixels; and (4) one line is skipped. After obtaining the signals of each line into the buffer 103, the signal values read out at (1) and (3) are added and averaged between lines. Such averaging between the lines is performed in the intermittence interpolation circuit 105 and results of the processing are stored in buffer 111 within the intermittence interpolation circuit 105.

In this manner, average values of G and R, or G and B can be obtained at each 4×4 pixel block based on the readouts of the above (1) to (4) by the drive control circuit 104 and the inter-line averaging processing at the intermittence interpolation circuit 105. As a result, the data obtained at the internal buffer 111 of the intermittent interpolation circuit 105 is an image similar to that obtained with popular double-sensor imaging system but reduced to ¼, as shown in FIGS. 4A and 4B. It should be noted that, as shown, the pattern of R/B is inverted frame by frame. The restoration processing required for generating a trichromatic color image from double-sensor imaging system is well known to those skilled in the art of double-sensor imaging system. The processing according to the known technique is performed also in the intermittence interpolation circuit 105.

A description will now be given by way of FIG. 4B with respect to an example of the restoration processing at the intermittence interpolation circuit 105. Since G component is obtained at all of the pixels, an interpolation processing is necessary for R or B component that is missing at each pixel. For example, an R component is missing at the location of the meshed pixel G1 in FIG. 4B, though B component is present as B1. Thus, with respect to G that is obtained at all pixels, the meshed pixel G1 and G pixels in the vicinity thereof indicated by hatches are compared to look for a vicinity pixel having a smallest difference. In particular, |G1−Gj| 0=2 to 5) is computed with respect to pixels G1 to G5 in FIG. 4B to obtain pixel Gj having the smallest difference. Rj corresponding to such pixel location is then taken as the value of R component at the meshed pixel location. After the interpolation of all missing color components at the intermittence interpolation circuit 105 in this manner, the image completed on the internal buffer 111 is outputted to the recording circuit 108 and display circuit 109 in a similar manner as in the normal image taking mode.

As can be seen from the above description, this embodiment contains the advantages as will be described below.

(1) For each 4×4 block, instead of readout to have all colors of RGB, an intermittent read is performed in such a manner that two of these colors are obtained and one color thereof is obtained in common to all 4×4 blocks. The occurrence of moire in each color component as an outcome of the intermittent read by itself is thereby suppressed and at the same time restoration (interpolation) of missing color components becomes easier. This is an advantage corresponding to the first aspect of the invention.

(2) Especially, the thinning out pattern is constructed so that color components are obtained at each block in combination of R and G or of B and G and such combinations forms a checkered pattern. The image obtained as a result of the intermittent readout thereby becomes an identical pattern as an image obtained by double-sensor imaging system so that the color processing thereafter becomes easier to be performed. This is an advantage corresponding to the second aspect of the invention.

(3) Further, by inverting the checker as described in the above (2) frame by frame, the colors of color moire caused by interpolation/restoration of missing color components from the two-sensor condition have a complementary-color relationship frame by frame so that, when observed as dynamic image, the color moire is displayed as color flicker. As a result that human vision is less sensitive to color flickers, there is an advantage of making color moire less conspicuous. This advantage corresponds to the fourth aspect of the invention.

It should be noted that some modifications are possible of the present embodiment. In a preferred modification, a known motion detection is performed at the intermittence interpolation circuit 105 by using G components at common read locations between frames. If determined as having no motion, then, values at corresponding locations of the preceding frame are used as the values of R or B components that are missing in the image in the internal buffer 111. As a result of the portion without motion, the color moire occurring in the double-sensor color processing can be reduced.

In another preferred modification, instead of inverting the thinning out patterns in combination of R and G or B and G among frames as shown in FIGS. 3D, 3E, readout types III and IV as shown in FIGS. 5A and 5B for example are additionally provided as the readout types of R, B, so that the combination of readout types I and III and combination of II and IV are alternatively used among frames, respectively. At the intermittence interpolation circuit 105, then, G components at the readout locations common to all the frames are used to detect motion by known methods such as a method based on inter-frame difference. If determined as having no motion, then, the operation for taking an average between frames is performed. By performing such processing, it becomes possible as a result of the inter-frame averaging to obtain more intermittent information at the portion without motion so that an advantage of reducing moire can be obtained. The constructions of these modifications correspond to the eighth aspect of the invention.

Second Embodiment

Figure 6:
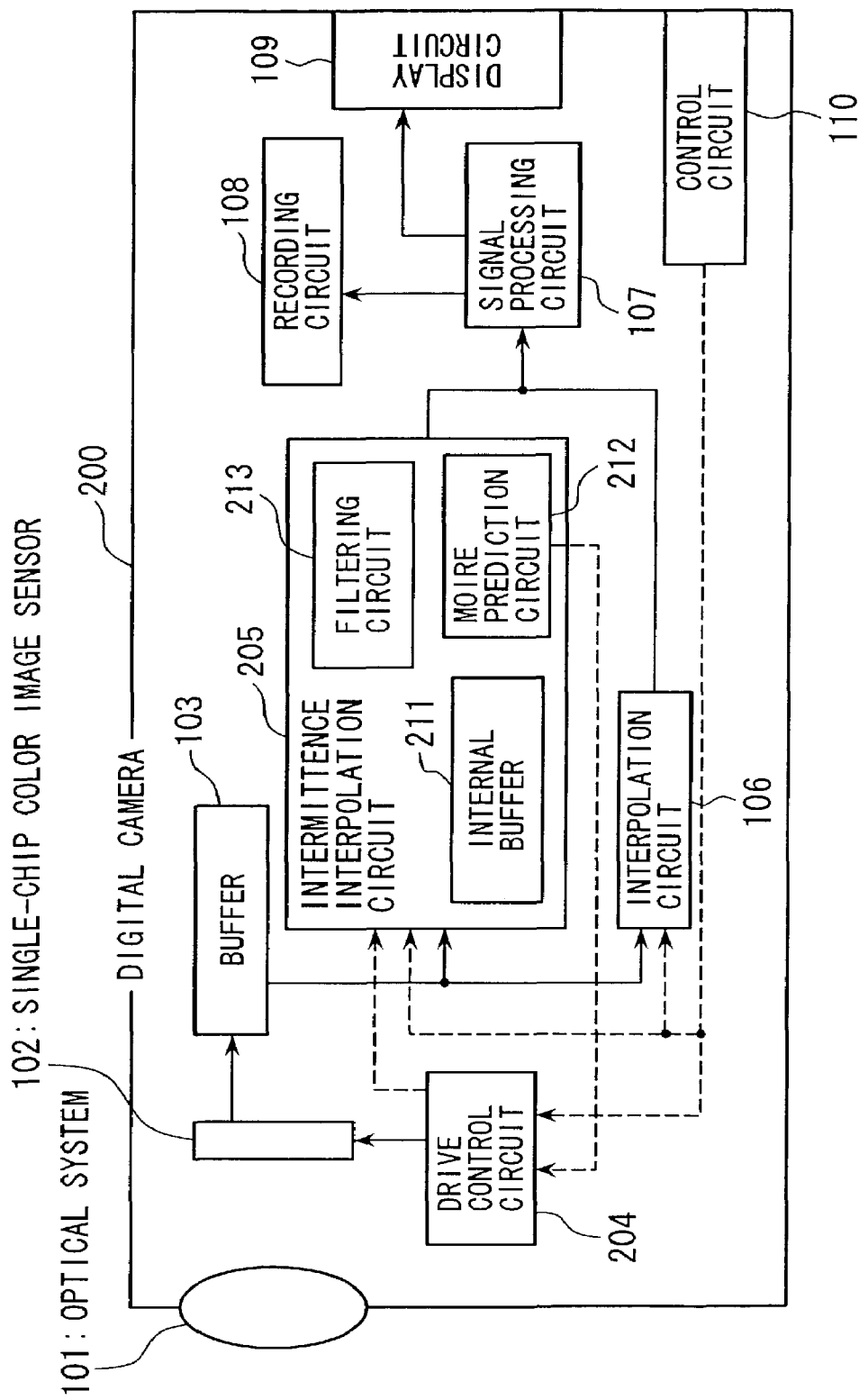
FIG. 6 is a block diagram showing the second embodiment of the invention.

A second embodiment of the invention will now be described. FIG. 6 is a block diagram showing the second embodiment, where the same components as in the first embodiment shown in FIG. 1 are denoted by the same reference numerals and description thereof will be omitted. Only those different components will now be described. While, like the first embodiment, the second embodiment is one in which the present invention is applied to a digital camera, the pattern of intermittent readout and control technique thereof are different from those of the first embodiment. In particular, unlike the first embodiment as shown in FIG. 6, a moire prediction circuit 212 and filtering circuit 213 are newly added to the interior of an intermittence interpolation circuit 205. A major difference in construction is that the signals from the moire prediction circuit 212 are fed back to the drive control circuit 204 so as to change the thinning out pattern according to the outcome of moire prediction. The construction of the rest is identical to the first embodiment.

Figure 7:
FIGS. 7A to 7E illustrate the intermittent readout method and filtering processing in the second embodiment.

In normal image taking, the operation of the second embodiment having such construction is identical to the first embodiment. In taking dynamic images, the drive control circuit 204 drives an intermittent readout of the single-chip color image sensor 102 as in the first embodiment. Two ways are additionally provided, however, as types of intermittent readout within 4×4 pixel block. In particular, the readout types III, IV shown in FIGS. 5A, 5B are additionally used as intermittent readout types. In actual readout, as shown in FIGS. 7A, 7B, a set is formed by readout type III and readout type I shown in FIG. 3B and another set is made by readout type IV and readout type II shown in FIG. 3C. One of the types of each set then makes a checkered pattern arrangement with one of the types of the other set. The checkered pattern as described is inverted frame by frame as shown in FIGS. 7A and 7B.

The manner in which one of the readout types in each of the above sets is used depends on result of the detection at the moire prediction circuit 212 in the preceding frame. The operation in taking dynamic images will now be described by supposing that flag "d" for designating by which one of readout types I and III readout is to be performed and by which type of II and IV of readout is to be performed is stored to the interior of the drive control circuit 204 with respect to blocks corresponding to pixels in the reduced image.

First the drive control circuit 204 performs an intermittent readout of the single-chip color image sensor 102 based on flag "d". Each read pattern is a combination of horizontal 2-pixel average, horizontal skip of reading and line skip in vertical direction. By using this, the drive control circuit 204 decomposes the readout pattern of each block into the basic operations for reassemblage to compute the required readout locations line by line of the single-chip color image sensor 102. For example, the read locations of each line in the case of flag "d" designated by the left side block of FIG. 7C are indicated by the hatches in FIG. 7C. The drive control circuit 204 drives the single-chip color image sensor 102 so that average values of pixel at computed read location and the pixel toward right by two pixels therefrom can be obtained line by line, and inputs the thinned out pixel values to the buffer 103.

Next, the intermittence interpolation circuit 205 performs processing in a similar manner as the first embodiment so that the reduced image similar to that obtained with double-sensor imaging system shown in FIGS. 4A, 4B is stored to the internal buffer 211. Of G components in this embodiment, however, the thinned out pixel values are read out from the buffer 103 by three lines at a time, and, after extracting only G components from each line, a filtering operation in the vertical direction is performed by the filtering circuit 213. The filtering factors for the three lines are [¼, ½, ¼]. By this processing, as shown in FIG. 7D, an equivalent result as that obtained by passing the original image through a low-pass filter having the filter factors shown in FIG. 7E is obtained so that moire in the vertical direction can be suppressed as compared to the G components computed in the first embodiment. A number (½ or ¼) indicated at the outside of the pixel block of FIG. 7D is the filter coefficient for each line. With respect to R, B components, on the other hand, data are read out from the buffer 103 and are subjected to averaging between lines so as to obtain an average value of four pixels indicated by parallelogram pattern of dotted line in FIGS. 3B and 3C and in FIGS. 5A and 5B in a similar manner as the first embodiment. After obtaining an image as shown in FIGS. 4A and 4B in this manner, the intermittence interpolation circuit 205 performs the restoration processing identical to that in the first embodiment and stores a final result thereof to the internal buffer 211.

In parallel with this, the moire prediction circuit 212 estimates locations at which moire is likely to occur in the next frame especially due to the restoration processing. In particular, sloping edges and stripes in the reduced image are detected. This is because R/B components in two-plate condition are arranged in a checker and thus tend to cause moire with respect to diagonal lines and diagonal stripes. For the detection of sloping edges and stripes, the moire prediction circuit 212 applies two filters F1, F2 shown in FIGS. 8A, 8B to G components obtained at all pixels of the reduced image and computes absolute values C1, C2 of the filtering result for each pixel. The filter F1 has a large absolute value in a stripe sloping upward to the right and F2 in a stripe sloping downward to the right. Those pixels having a difference in the absolute values (C1–C2) equals to or greater than a predetermined threshold T1 are determined as the pixels in an edge sloping upward to the right and those pixels equals to or smaller than a threshold T2 are determined as the pixels in an edge sloping downward to the right.

After completion of judgment by the moire prediction circuit 212, the intermittence interpolation circuit 205 determines based on result of the judgment flag "d" for designating the thinning out pattern of each 4×4 pixel block so that an optimal thinning out pattern can be obtained in the next frame.

Figure 8:
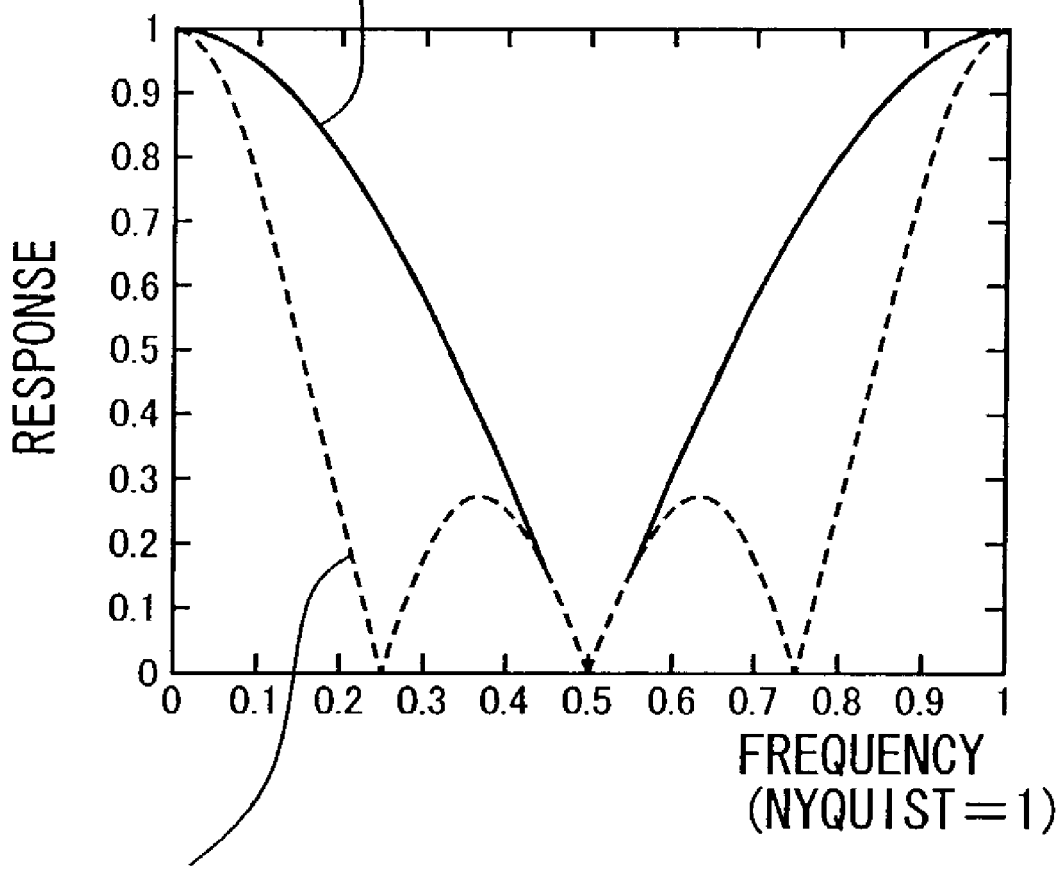
FIGS. 8A to 8C illustrate filters for use in moire prediction in the second embodiment and frequency characteristic in the case of using readout types I and III in obtaining R components.

An advantage of selecting thinning out pattern will now be described by way of FIG. 8C. FIG. 8C indicates difference of band in diagonal directions of the R components between the case of readout type I of FIG. 3B and the case of readout type III of FIG. 5A as the thinning out pattern of block.

In FIG. 8C, the abscissa represents the closeness of stripes by means of frequency and the ordinate represents blurredness of the stripes by response (response 1: low blurredness, response 0: high blurredness). In this manner, R or B components obtained by the thinning out patterns of this embodiment are asymmetrical in the frequency characteristic of diagonal directions and the asymmetrical relationship is inverted by selection of the patterns. As the readout pattern in blocks corresponding to an image region having a high band in a specific diagonal direction, selection of one having a large band lowering effect in that direction thus makes it possible to reduce moire contained in R/B components in the next frame, on assumption that motion between frames is small.

Based on this concept, the intermittence interpolation circuit 205 sets flag "d" within the drive control circuit 204 so that readout type I or II becomes the read pattern in the next frame of the pixels judged as an edge sloping upward to the right by the determination at the moire prediction circuit 212. On the other hand, flag "d" is set so that readout type III or IV becomes the read pattern of the pixels judged as an edge sloping downward to the right. Further, with respect to blocks corresponding to pixels judged as neither, it is set so that the same one as the current frame is selected.

After completion of the processing at the intermittence interpolation circuit 205, an identical processing as in the first embodiment is performed. As can be seen from the above description, the present embodiment contains advantage as will be described below.

(1) In performing thinning out, since a color component that can be obtained in common to all pixels in the reduced image after the thinning out is provided, such component can be used to check the frequency characteristic of each region of the image. By optimally selecting the thinning out pattern in the next frame in accordance therewith, an occurrence of color moire can be suppressed. This advantage corresponds to the ninth aspect of the invention.

Third Embodiment

Figure 9:
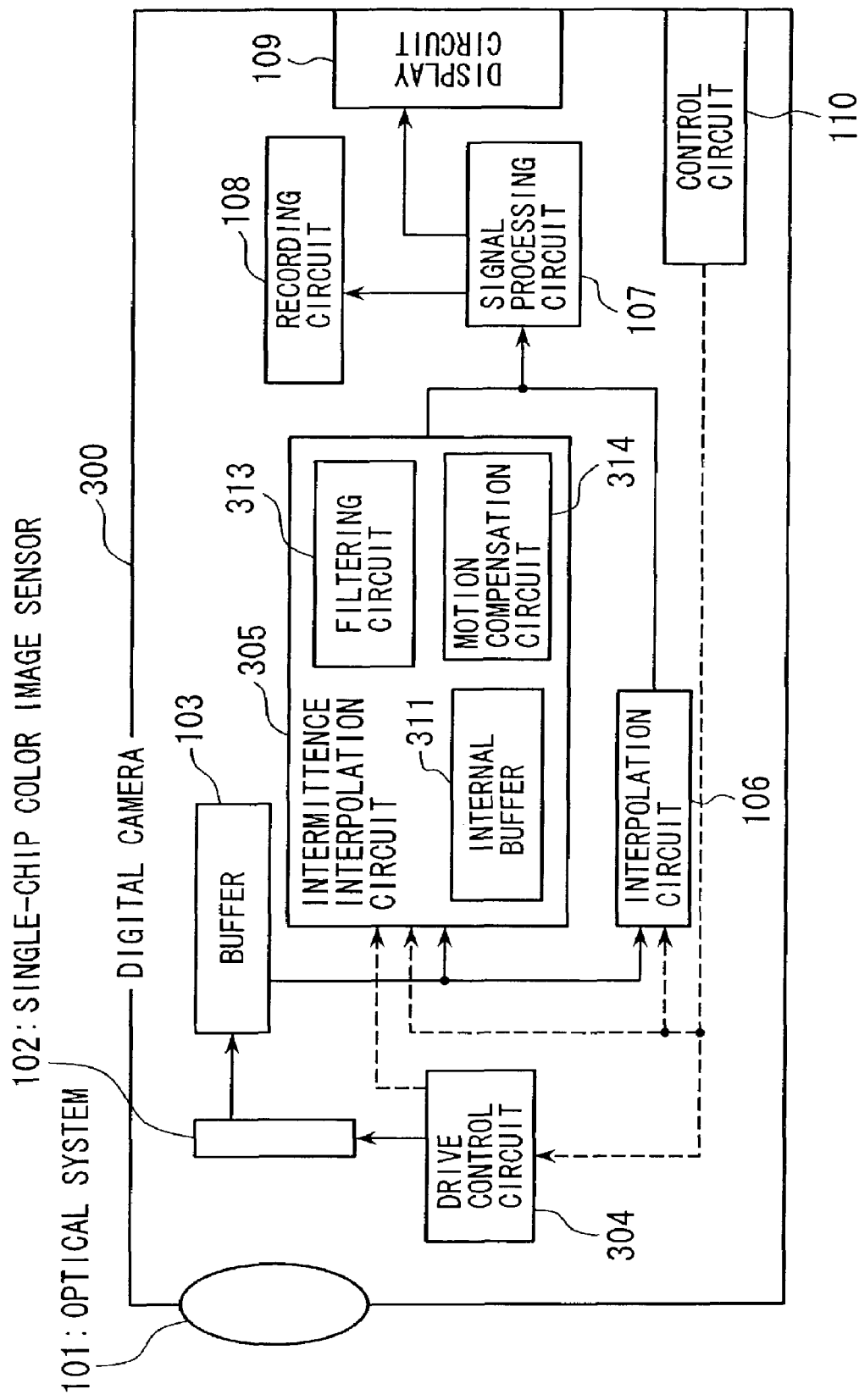
FIG. 9 is a block diagram showing a third embodiment of the invention.

A third embodiment of the invention will now be described. FIG. 9 is a block diagram showing the third embodiment, where the same components as in the first embodiment shown in FIG. 1 are denoted by the same reference numerals and description thereof will be omitted. Only those different components will now be described. As shown in FIG. 9, the third embodiment is one in which the present invention is applied to a digital camera as in the first embodiment. In the present embodiment, unlike the first embodiment, a motion compensation circuit 314 and filtering circuit 313 are newly added to the interior of the intermittence interpolation circuit 305. Further, the manner of thinning out of the drive control circuit 304 is also different from the first embodiment. The construction of the rest is identical to the first embodiment.

In normal image taking, the operation of the third embodiment having such construction is identical to the first embodiment. In taking dynamic images, the drive control circuit 304 drives an intermittent readout of the single-chip color image sensor 102 as in the first embodiment. Instead of changing the intermittent readout pattern at every 4×4 pixel block as in the first embodiment, however, the intermittent readout pattern is changed frame by frame. The intermittent readout pattern is of readout type I shown in FIG. 3B for all blocks in frame $2n$ and is of readout type II shown in FIG. 3C for all blocks in frame $2n+1$. The drive control circuit 304 drives the single-chip color image sensor 102 by switching the intermittent readout pattern frame by frame and stores line by line the result of the intermittent readout to the buffer 103 while performing averaging processing in the horizontal direction in a similar manner as in the second embodiment.

Figures 10A, 10B, 11A, 11B:
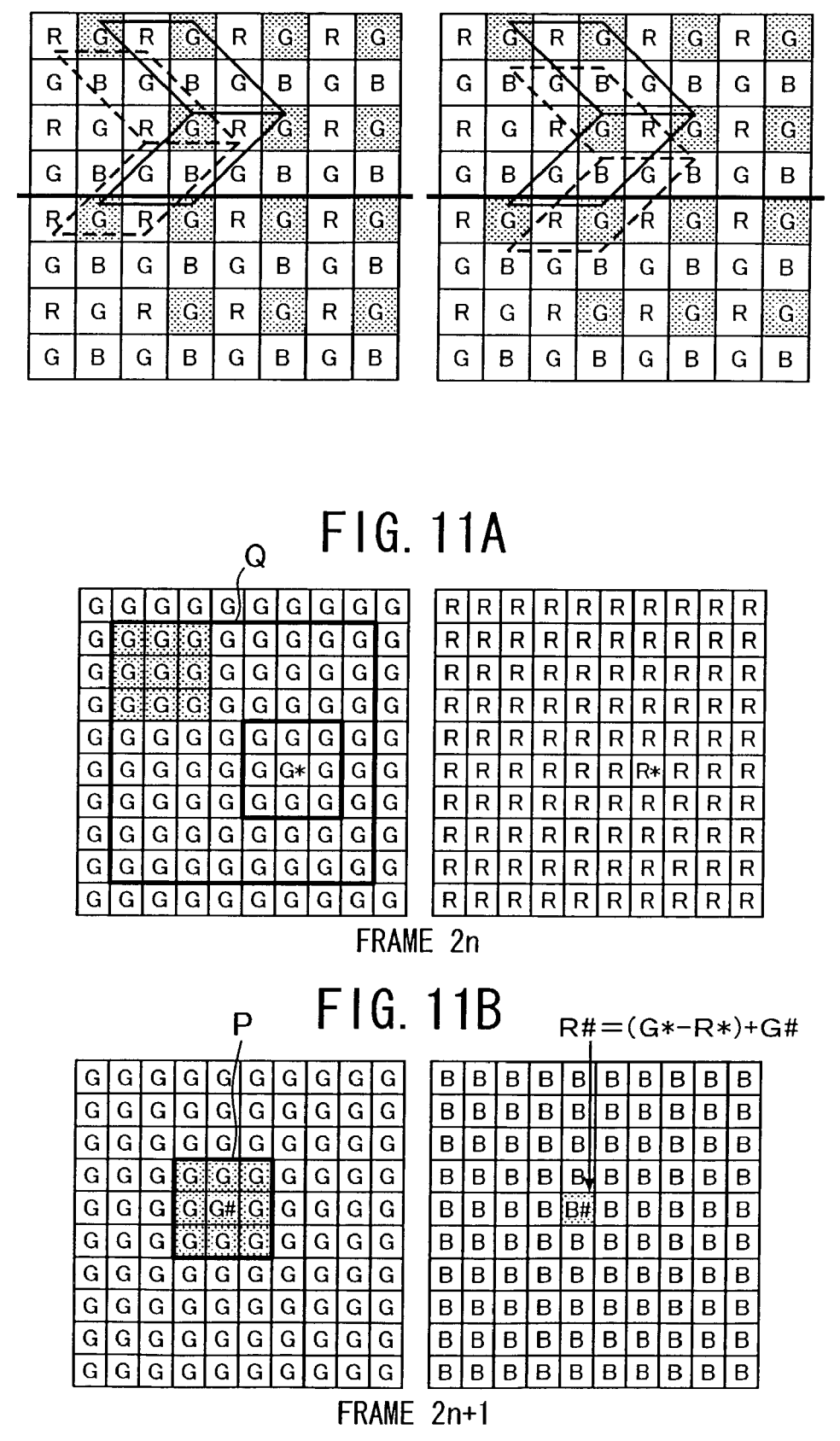

When the intermittent readout is complete, the intermittence interpolation circuit 305 performs an averaging processing of each color component. At this time, a filtering processing is performed between lines similarly to the second embodiment. The filter factors are the same as those shown in FIG. 7D in connection with the second embodiment, i.e. [¼ ½ ¼]. Unlike the second embodiment, however, the filtering processing between lines is performed not only of G components but of all color components. As a result of the filtering processing, as shown in FIGS. 10A, 10B, the same advantage as passing the respective color components of the original image through a low-pass filter having the same filter factors as those shown in FIG. 7E can be obtained. The result of averaging is stored to the internal buffer 311 so that, as shown in FIGS. 11A, 11B, reduced R, G components in frame $2n$ and reduced B, G components in frame $2n+1$ are obtained.

Next, since R or B components are lacked in each frame, the intermittence interpolation circuit 305 estimates the missing components by using information of the preceding frame. A method will now be shown by way of example for estimating R component corresponding to the location of G# pixel meshed in FIG. 11B. First, the motion compensation circuit 314 estimates to which location in the preceding frame shown in FIG. 11A the meshed location shown in FIG. 11B corresponds, by using G components obtained in common between the frames. In particular, a known motion vector estimating method is used. For example, with respect to a 3×3 pixel range P in the vicinity of G# pixel location of FIG. 11B, a search range Q as indicated by the thick frame in FIG. 11A is set. Matching is then performed between the 3×3 pixel range P and all 3×3 vicinity pixel ranges (an example being the meshed range on the upper left corner of search range Q) within the search range Q to compute a vicinity location at which the matching error is smallest. The 3×3 vicinity pixel range about G* pixel location in FIG. 11A corresponds to such condition.

When, for all pixels of the reduced image, the corresponding location in the preceding frame is obtained in this manner by the motion compensation circuit 314, the intermittence interpolation circuit 305 takes the difference between R component (R*) and G component (G*) corresponding to the missing color component in the current frame at the corresponding location in the preceding frame. What is obtained by adding G component (G#) in the current frame to such difference is stored to the internal buffer 311 as the value of the missing color component in the current frame. In the example shown in FIGS. 11A, 11B, the estimated value of the missing component (R) at G# pixel location shown in FIG. 11B is computed as R#=G#+(R*−G*) by using the pixel values R*, G* at the corresponding location in FIG. 11A.

The operation of digital camera 300 after completion of the processing of the intermittence interpolation circuit 305 is identical to the first embodiment. As can be seen from the above description, the present embodiment contains advantages as will be described below.

(1) By providing as the kinds of color components to be obtained by thinning out both the color component to be read out in common between frames and the color component to be read out only in specific frames, it is possible in each frame to suppress the occurrence of moire in the color components obtained by intermittent readout. At the same time, the missing color component can also be correctly interpolated/restored by using the common color component to estimate a corresponding relationship between the frames directly before and after each other. This advantage corresponds to the third aspect of the invention.

(2) The corresponding relationship of locations between frames before and after each other is computed by using G components to be read out in common between the frames, and in addition a correlative relation between G component and R or B component read out only in the preceding frame (difference between R component and G component or difference between B component and G component in the present embodiment) is computed. From such correlation and G component read out in the current frame, then, the color component not read out in the current frame is estimated so that the missing color component in the current frame can be accurately estimated. This advantage corresponds to the seventh aspect of the invention.

Figure 12A:
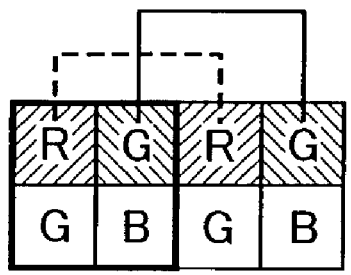
FIGS. 12A to 12F illustrate a modification of processing at the motion compensation circuit in the third embodiment.
Figure 12B:
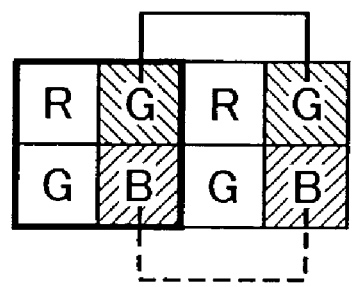
Figure 12C:
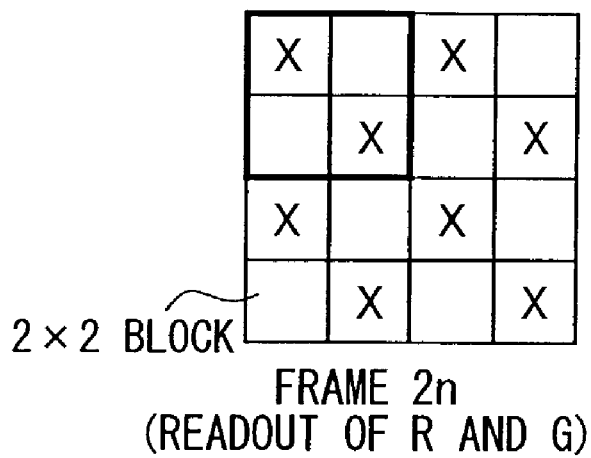

It should be noted that preferred modifications of this embodiment include the following. For example, considering 2×2 blocks instead of 4×4 blocks, the intermittent readout shown in FIGS. 10A, 10B can be achieved by combination of readout types X and Y shown in FIGS. 12A, 12B. In readout type X, average value of R indicated by dotted line and average value of G indicated by solid line are read out with respect to the 2×2 block indicated by a thick frame. In readout type Y, average value of B indicated by dotted line and average value of G indicated by solid line are read out with respect to the 2×2 block indicated by a thick frame. A frame where G and R are to be read out then can be achieved as shown in FIG. 12C by repeating readout by readout type X in a checker consisting of 2×2 blocks. Further a frame where G and B are to be read out is achieved as shown in FIG. 12D by repeating readout by readout type Y in a checker consisting of 2×2 blocks.

Figure 12D:
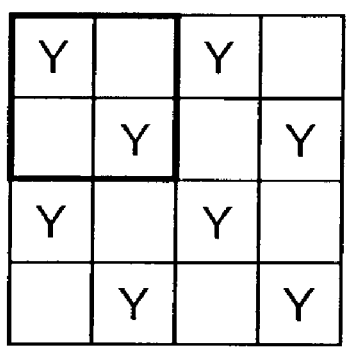
Figure 12E:
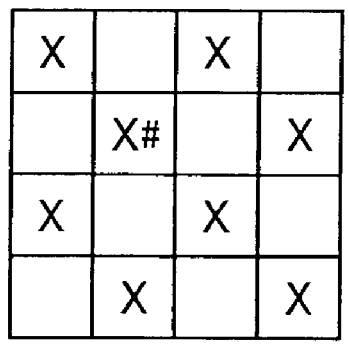
Figure 12F:
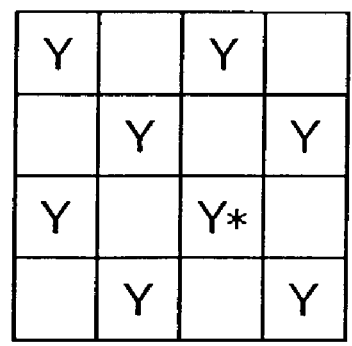

It has been thought in the above described embodiment that R and G or B and G can be obtained frame by frame for each 4×4 block which is obtained by combining four 2×2 blocks as indicated by the thick frames in FIGS. 12C, 12D. If however 2×2 block is considered as a unit, R and G or B and G are thus obtained in a checker frame by frame. A similar motion detection as that in the above described embodiment is performed by using 2×2 pixel blocks to obtain a 2×2 block within the preceding/subsequent frame corresponding to a specific 2×2 block. It is thereby seen that, for example, the pixel location with "*" in frame $2n+1$ corresponds to the pixel location with "#" in frame $2n$ as shown in FIGS. 12E, 12F. After checking such correspondence for all 2×2 blocks of which values are obtained, the missing color component at each block is then estimated based on such correspondence.

The estimating method is similar to the above described embodiment. For example, in FIG. 12E, the missing color component B# at the pixel location with "#" in frame $2n$ is estimated as follows. In particular, from G*, B* obtained at the corresponding pixel location with "*" in frame $2n+1$ shown in FIG. 12F and from G# obtained at the pixel location with "#" in frame 2n, B#=(B*−G*)+G# is estimated. At last, after estimating the missing color component in this manner at each 2×2 block, trichromatic component values of 4×4 block corresponding to one pixel in the reduced image are computed by averaging four, i.e. vertically two and horizontally two, trichromatic component values of 2×2 blocks. In this method, the block size for obtaining correspondence is smaller than the above described embodiment so that the missing color component can be more accurately estimated.

Figure 13:
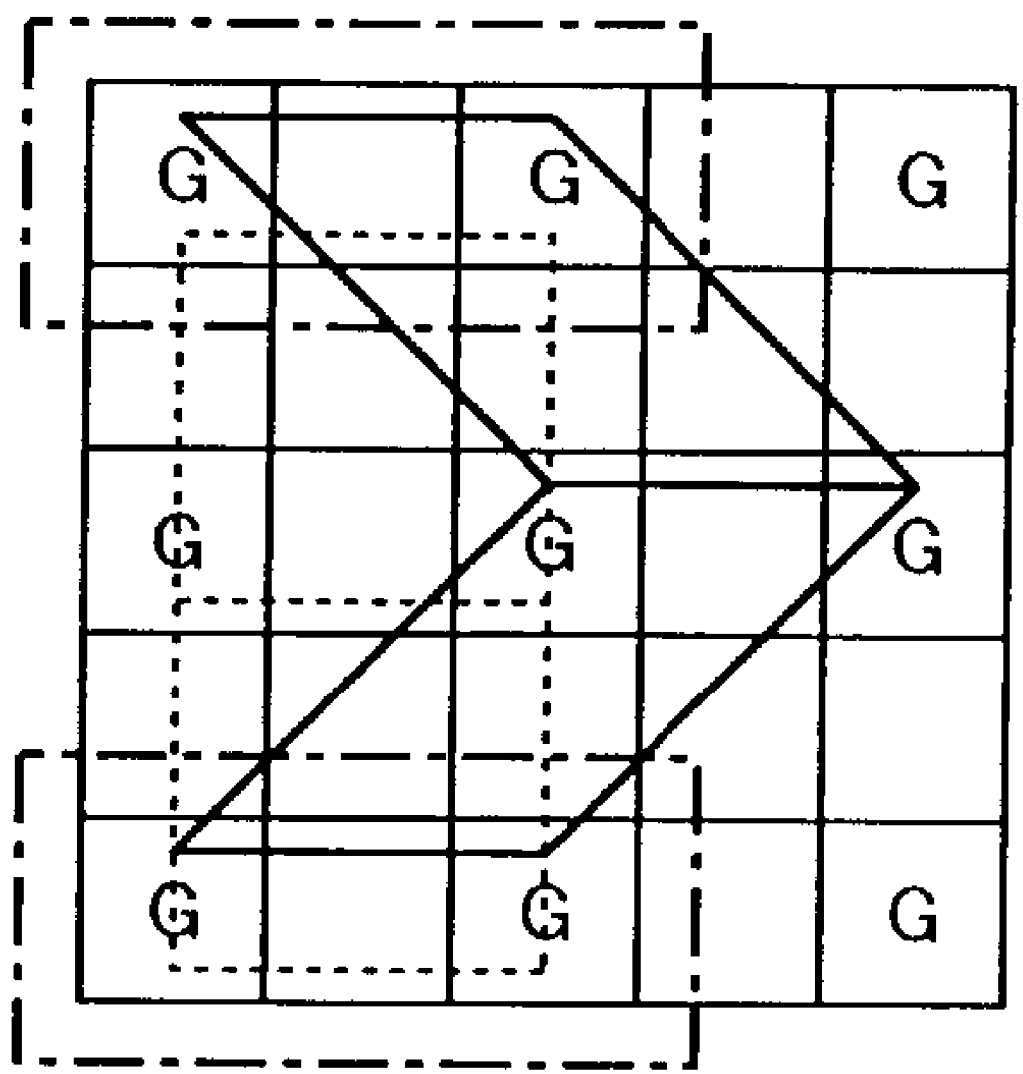
FIG. 13 shows a modification of intermittent readout pattern in the third embodiment.

In yet another preferred modification, the thinning out pattern of G components is changed between frames. As shown in FIG. 13, while the thinning out pattern (solid line) shown in the present embodiment is used in frame 2n, a thinning out pattern (dotted line) different therefrom is used in frame 2n+1. Here the readout locations framed by chain line in FIG. 13 are not to be changed between the frames. At the motion compensation circuit 314, then, motion detection between frames is performed by using the signals of those G pixels at the readout locations that are not changed between the frames. For those pixels judged as having no motion, G component of the preceding frame and G component of the current frame are averaged. As a result, it is possible to reduce the moire of the thinned out G components. This advantage corresponds to the fifth aspect of the invention.

Fourth Embodiment

A fourth embodiment of the invention will now be described. FIG. 14 is a block diagram showing the fourth embodiment, where the same components as in the first embodiment shown in FIG. 1 are denoted by the same reference numerals and description thereof will be omitted. Only those different components will now be described. As shown in FIG. 14, while the fourth embodiment is one in which the present invention is applied to a digital camera as in the first embodiment, a major difference is that it is a triple-sensor imaging system. An optical image is picked up through a color separation prism as respective color components by R image sensor 402a, G image sensor 402b, B image sensor 402c, and the outputs from the respective image sensors are inputted to the same buffer 103. Each image sensor is provided with the same intermittent readout function as the single-chip color image sensor 102 of the first embodiment, and a drive control circuit 404 is capable of separately performing the respective intermittent readout drives of the three image sensors. Further a color correlation computing circuit 414 and filtering circuit 413 are newly added to the intermittence interpolation circuit 405. The rest is identical to the first embodiment except that the interpolation circuit 106 is absent due to the triple-sensor imaging system.

The operation of thus constructed fourth embodiment is similar to that of the first embodiment in normal image taking. There is a difference however in that, when the drive control circuit 404 drives the R image sensor 402a, G image sensor 402b, B image sensor 402c in all-pixel read mode, a trichromatic color image is directly obtained at the buffer 103, and the signal processing circuit 107 directly reads out the trichromatic color image from the buffer 103 to perform image quality improving processings. In taking of dynamic images, on the other hand, the drive control circuit 404 drives the R image sensor 402a, G image sensor 402b, B image sensor 402c in an intermittent readout mode. The intermittence interpolation circuit 405 effects interpolation processing on the intermittently read output inputted to the buffer 103 from each image sensor to generate a trichromatic color image and then outputs it to the signal processing circuit 107. The operation of the drive control circuit 404 and the intermittence interpolation circuit 405 will be described below. The description will be given similarly to the foregoing embodiments with respect to the case where the reducing rate is ¼ and the readout rate is four pixels per 4×4 pixel block.

The manner of thinning out at each image sensor by the drive control circuit 404 is, in all frames, as indicated by the mesh in FIG. 15A respectively on the three image sensors. These are characterized in that some portion of the read locations is common to the image sensors and some other portion is not. Those read locations that are common among image sensors are shown in FIGS. 15B, 15C. The pixels of the meshed portion are read out from each image sensor by the drive control circuit 404 as averages of two pixels in the horizontal direction and are stored to a region in the buffer 103 that is separately provided for each image sensor.

When the intermittent readout is complete, the intermittence interpolation circuit 405 performs an averaging processing of data within the buffer 103 similarly to other embodiments. At this time, the intermittent readout results of the three image sensors are integrated to estimate signal values at the locations not read out by the intermittent readout from each image sensor and then averaging operation is performed to make a reduction of moire possible. The estimating methods will be described below by way of an example shown in FIG. 16.

Referring to FIG. 16, the pixel locations surrounded by thick black rectangular frame are the intermittent readout locations that are common to R image sensor 402a and G image sensor 402b. A correlation computing circuit 414 estimates color correlation between R components and G components within each 4×4 block from signals R*, G* that are obtained at such common locations. As simplest technique in the present embodiment, difference in average values at the common readout locations, D=Avg(R*)−Avg(G*) is computed as parameter representing color correlation (Avg representing average). Since average values in the horizontal direction are already obtained at the buffer 103, the correlation computing circuit 414 is only required to further average the outputs corresponding to the common readout locations from the two image sensors to take difference thereof. In addition to this, various other formulas such as Avg(R*)/Avg(G*) are possibly used to compute the parameter for representing color correlation.

After such computation, the intermittence interpolation circuit 405 estimates values not read out with respect to those locations at which the values are not read out from one image sensor but at which the values are read out from another image sensor. In the example shown in FIG. 16, with respect to the location at which two-pixel average value R# is read out from R image sensor 402a, a two-pixel average value G# on G image sensor 402b at such location is estimated based on R#-D by using result of the color correlation parameter computation at the common readout locations. After estimating pixels values at those read locations which are not common to all image sensors in this manner, the intermittence interpolation circuit 405 computes average values at each 4×4 block and stores it to an internal buffer 411.

The operation of digital camera 400 after completion of the processing of the intermittence interpolation circuit 405 is identical to that in the first embodiment. As can be seen from the above description, the present embodiment contains advantage as will be described below.

(1) In thinning out processing of triple-sensor imaging system, the readout pattern of each color component is designed so that some readout portion are common to all color components and the rest are not. A local correlation (color correlation parameter) between color components is then computed from the common readout portion and this is applied to the not-common readout portion. It is thereby possible to estimate signals at the locations not obtained in the intermittent readout of each color component. By performing averaging processing by also including such estimated values, luminance moire occurring at the time of thinning out can be suppressed even in the triple-sensor imaging system. This advantage corresponds to the sixth aspect of the invention.

As has been described by way of the above embodiments, according to the first aspect of the invention, signals at a plurality of locations on the image sensor are read out in a thinned out manner correspondingly to each pixel of a reduced image. At this time, such intermittent readout is performed so that there are two or more types of color filters at the readout locations and at least one type of the color filters is common to all pixels of the reduced image and at least one type of the color filters is not. An occurrence of moire in the reduced image is thereby suppressed and it becomes possible to readily perform interpolation/restoration of missing color components.

According to the second aspect, the image obtained from the intermittent readout results in an identical pattern as image obtained in double-sensor imaging system so that the color processing thereafter can be readily performed.

According to the third aspect, there are two or more types of color filters to be read out common to all pixels of a reduced image. An intermittent readout is then performed so that at least one type of the color filters thereof is common to all the frames and at least one type of the color filters is different among the frames. It is thereby possible in each frame to suppress the moire of the color components obtained by the intermittent readout. Further, the common color component can be used to estimate correspondence between frames succeeding and preceding each other so as to accurately interpolate/restore missing color components.

According to the fourth aspect, a checkered pattern of pixel arrangement corresponding to the combined readout is inverted between successive two frames. The colors of color moire occurring in interpolation/restoration of missing color components thus have a complementary-color relationship from one frame to the next so that the color moire is displayed as color flicker when observed as dynamic images. As a result that human vision has a lower sensitivity to color flicker, an advantage is obtained that the color moire is made less conspicuous.

According to the fifth aspect, in repeating an intermittent readout in each frame, at least one type of color components is read out in common between frames and, of the color component read out in common among the frames, the readout locations are partially common and partially not common to all the frames. Motion is thereby detected by using pixel signals at the readout locations common to all the frames and average of the frames is obtained with respect to those pixel signals without motion so that moire in the thinned out color component image can be reduced.

According to the sixth aspect, in the thinning out processing of imaging system having a plurality of image sensors having different types of color filters, an intermittent readout pattern is provided with a readout portion common and a readout portion not common to the image sensors. A local color correlation parameter is then computed from the common readout portion and, based on this, a color component value of the not-common readout portion is estimated. The trichromatic components of each pixel of a reduced image are then obtained from both such estimated color component values and actually readout color component values. Thereby luminance moire occurring at the time of thinning out can be suppressed even in an imaging system having a plurality of image sensors.

According to the seventh aspect, of vicinity pixels judged as having high similarity, correlative relationship is estimated between a signal of color filter of the type not obtained at an observed pixel and a signal of color filter of the type obtained at the observed pixel. Based on the result of such estimation and the signal value obtained at the observed pixel, trichromatic components of each pixel in a reduced image are computed. It is thereby possible to accurately estimate missing color components in the current frame.

According to the eighth aspect, in repeating an intermittent readout in each frame, reading is performed so that readout locations are partially common and are partially not common to the frames to detect motion between the frames based on signals at the readout locations common to the frames. If judged as that there is no motion based on the result of such detection, then, signals at the not-common read locations are used in the interpolation processing. It is thereby possible to achieve an effect of reducing moire of the portion not having motion without causing a failure in the processing result.

According to the ninth aspect, in performing thinning out, since a color component signal obtained in common to all pixels is generated in a reduced image after the thinning out, frequency characteristic of each region of the image can be measured by using such common color component signal. An occurrence of color moire can thus be suppressed by optimally selecting an intermittent readout pattern in the next frame in accordance with such frequency characteristic.

What is claimed is:

1. An imaging apparatus comprising:
    a single-chip image sensor with a color filter array and capable of intermittent readout operation in horizontal and vertical directions;
    a controller for controlling the intermittent readout operation of said image sensor; and
    an interpolator for processing signals read out from said image sensor in a thinned out pattern designated by said controller to form a reduced image consisting of trichromatic components;
    wherein said controller reads signals at a plurality of locations on said image sensor corresponding to each pixel of said reduced image and controls reading at that time so that there are two or more types of color filters at the readout locations and at least one type of the color filters thereof is common to all pixels of said reduced image and at least one type of the color filters is not common to all pixels of said reduced image; and
    said interpolator supplements signals corresponding to the type of unread color filter at each pixel of said reduced image to compute trichromatic components of an observed pixel.

2. The imaging apparatus according to claim 1,
    wherein said color filter array comprises a primary-color Bayer matrix; and
    said controller controls reading so that a combination of R and G or a combination of B and G comprise the types of color filters to be read out corresponding to each pixel of said reduced image and at the same time controls reading to achieve a checkered pattern arrangement of the pixels corresponding to said combined readouts of R and G and the pixels corresponding to said combined readouts of B and G.

3. The imaging apparatus according to claim 2, wherein said controller repeats an intermittent readout of a frame from said image sensor at predetermined time intervals and controls reading at that time so that the arrangement of the pixels corresponding to said combined readouts of the color filters of R and G and the pixels corresponding to said combined readouts of the color filters of B and G in said reduced image is inverted between two successive frames.

4. The imaging apparatus according to claim 1, wherein said controller repeats an intermittent read of frame from said image sensor at predetermined time intervals and controls reading at that time so that two or more types of the color filters are read out in common to all pixels of said reduced image, and at least one type of the color filters thereof is common to all the frames and at the same time at least one type of the color filters is different among the frames.

5. The imaging apparatus according to claim 1, wherein said controller repeats an intermittent readout of a frame from said image sensor at predetermined time intervals and controls reading at that time so that at least one type of color component is read out in common among frames and at the same time the readout locations of the color component of the type to be read out in common among the frames are partially in common and partially different among the frames.

6. The imaging apparatus according to any one of claims 1, 2, 4, 3 or 5,
wherein said interpolator computes a similarity between an observed pixel those pixels in the vicinity thereof in time and in space based on comparison of signals of the color filters of the type obtained common to all pixels at each pixel of said reduced image and, with respect to the vicinity pixels judged as having a high similarity, estimates color correlative relation between signals of the color filter of the type not obtained at the observed pixel and signals of the color filter of the type obtained at the observed pixel to compute trichromatic components of each pixel of said reduced image based on a result of the estimation and signal value obtained at the observed pixel.

7. The imaging apparatus according to any one of claims 1, 2, 4, 3 or 5,
wherein said controller repeats an intermittent readout of a frame from said image sensor at predetermined time intervals and controls reading at that time so that readout locations are partially common and partially not common between successive frames; and
said interpolator detects motion between the frames based on signals at the read locations common between the frames to determine, based on a result of a detection, whether or not to use signals at said not-common readout locations in interpolation processing.

8. The imaging apparatus according to any one of claims 1, 2, 4, 3 or 5,
wherein said controller repeats an intermittent readout of a frame from said image sensor at predetermined time intervals, and at that time said interpolator measures a local frequency characteristic within the frame based on signals of the color filters of the type read out in common to all pixels of said reduced image, and the controller determines an intermittent readout pattern of a next frame in accordance with a result of the measurement of said frequency characteristic.

9. An imaging apparatus comprising:
a plurality of image sensors capable of an intermittent readout operation in horizontal and vertical directions and respectively having a different type of color filters in front thereof;
a controller for controlling the intermittent readout operation of said plurality of image sensors; and
an interpolator for processing signals read out from said plurality of image sensors in a thinned out pattern designated by the controller to form a reduced image consisting of trichromatic components;
wherein said controller reads signals at a plurality of locations on each of said image sensors corresponding to each pixel of said reduced image and controls reading at that time so that some of the read locations from each of the image sensors are different among the image sensors and some others thereof are common to all the image sensors; and
said interpolator estimates a color correlation parameter of signals from the respective image sensors at the readout locations common to all said image sensors at each pixel of said reduced image to compute trichromatic components of each pixel of said reduced image based on result of the estimation and signals from the respective image sensors.

10. An imaging apparatus comprising:
a single-chip image sensor with a color filter array and capable of intermittent readout operation in horizontal and vertical directions;
control means for controlling the intermittent readout operation of said image sensor; and
interpolation means for processing signals read out from said image sensor in a thinned out pattern designated by said control means to form a reduced image consisting of trichromatic components;
wherein said control means reads signals at a plurality of locations on said image sensor corresponding to each pixel of said reduced image and controls reading at that time so that there are two or more types of color filters at the readout locations and at least one type of the color filters thereof is common to all pixels of said reduced image and at least one type of the color filters is not common to all pixels of said reduced image; and
said interpolation means supplements signals corresponding to the type of unread color filter at each pixel of said reduced image to compute trichromatic components of an observed pixel.

11. The imaging apparatus according to claim 10,
wherein said color filter array comprises a primary-color Bayer matrix; and
said control means controls reading so that a combination of R and G or a combination of B and G comprise the types of color filters to be read out corresponding to each pixel of said reduced image and at the same time controls reading to achieve a checkered pattern arrangement of the pixels corresponding to said combined readouts of R and G and the pixels corresponding to said combined readouts of B and G.

12. The imaging apparatus according to claim 11,
wherein said control means repeats an intermittent readout of a frame from said image sensor at predetermined time intervals and controls reading at that time so that the arrangement of the pixels corresponding to said combined readouts of the color filters of R and G and the pixels corresponding to said combined readouts of the color filters of B and G in said reduced image is inverted between two successive frames.

13. The imaging apparatus according to claim 10, wherein said control means repeats an intermittent read of frame from said image sensor at predetermined time intervals and controls reading at that time so that two or more types of the color filters are read out in common to all pixels of said reduced image, and at least one type of the color filters thereof is common to all the frames and at the same time at least one type of the color filters is different among the frames.

14. The imaging apparatus according to claim 10, wherein said control means repeats an intermittent readout of a frame from said image sensor at predetermined time intervals and controls reading at that time so that at least one type of color component is read out in common among frames and at the same time the readout locations of the color component of the type to be read out in common among the frames are partially in common and partially different among the frames.

15. The imaging apparatus according to any one of claims 10, 11, 13, 12 or 14, wherein said interpolation means computes a similarity between an observed pixel and those pixels in the vicinity thereof in time and in space based on comparison of signals of the color filters of the type obtained common to all pixels at each pixel of said reduced image and, with respect to the vicinity pixels judged as having a high similarity, estimates color correlative relation between signals of the color filter of the type not obtained at the observed pixel and signals of the color filter of the type obtained at the observed pixel to compute trichromatic components of each pixel of said reduced image based on result of the estimation and signal value obtained at the observed pixel.

16. The imaging apparatus according to any one of claims 10, 11, 13, 12, or 14, wherein said control means repeats an intermittent readout of a frame from said image sensor at predetermined time intervals and controls reading at that time so that readout locations are partially common and partially not common between the successive frames; and said interpolation means detects motion between the frames based on signals at the read locations common between the frames to determine based on result of the detection whether or not to use signals at said not-common readout locations in interpolation processing.

17. The imaging apparatus according to any one of claims 10, 11, 13, 12 or 14, wherein said control means repeats an intermittent readout of a frame from said image sensor at predetermined time intervals, and at that time said interpolation means measures a local frequency characteristic within the frame based on signals of the color filters of the type read out in common to all pixels of said reduced image, and the control means determines an intermittent readout pattern of next frame in accordance with a result of the measurement of said frequency characteristic.

18. An imaging apparatus comprising:

a plurality of image sensors capable of an intermittent readout operation in horizontal and vertical directions and respectively having different type of color filters in front thereof;

control means for controlling the intermittent readout operation of said plurality of image sensors; and interpolation means for processing signals read out from said plurality of image sensors in a thinned out pattern designated by the control means to form a reduced image consisting of trichromatic components;

wherein said control means reads signals at a plurality of locations on each of said image sensors corresponding to each pixel of said reduced image and controls reading at that time so that some of the read locations from each of the image sensors are different among the image sensors and some others thereof are common to all the image sensors; and said interpolation means estimates color correlation parameter of signals from the respective image sensors at the readout locations common to all said image sensors at each pixel of said reduced image to compute trichromatic components of each pixel of said reduced image based on result of the estimation and signals from the respective image sensors.

* * * * *